Dec. 26, 1950  B. L. VIBBERT  2,535,523
BATTERY CHARGING TABLE

Filed May 11, 1948  2 Sheets-Sheet 1

B. L. Vibbert
INVENTOR
BY Cl. Snow & Co.
ATTORNEYS.

Dec. 26, 1950  B. L. VIBBERT  2,535,523
BATTERY CHARGING TABLE
Filed May 11, 1948  2 Sheets-Sheet 2

B. L. Vibbert
INVENTOR
BY C. A. Snow & Co.
ATTORNEYS.

Patented Dec. 26, 1950

2,535,523

UNITED STATES PATENT OFFICE 2,535,523

BATTERY-CHARGING TABLE

Burton L. Vibbert, Euclid, Ohio

Application May 11, 1948, Serial No. 26,387

1 Claim. (Cl. 136—173)

This invention relates to a battery charging table designed particularly for use in recharging the battery of industrial platform and lift trucks such as are commonly used on docks, freight platforms, warehouse floors, and the like.

Due to the almost continuous use to which such trucks are put, their batteries run down frequently and require considerable recharging. It may be noted that the chargers used for the purpose of recharging the battery are generally of the automatic type, the charging process being shut down as soon as the batteries reach a state of full charge. The charging time required is generally eight or more hours, this time varying according to the condition and type of battery, number of cells, ampere hour capacity, or the like.

It will be recognized that charging facilities which are inadequate or unsuitable will obviously and inevitably shorten battery life, increase maintenance costs, and reduce maximum truck efficiency.

It is an important object of the present invention, accordingly, to provide a novelty designed battery charging table, adapted specifically to the recharging of batteries of the type described, the table being specially adapted to permit the speedy and easy removal of the batteries from the trucks; to permit equally speedy and easy remounting of the batteries in the trucks after the batteries are charged; to permit a plurality of batteries to be recharged simultaneously; to permit dead trucks to be moved up to and away from the table; and to accomplish these results with a structure taking up comparatively little space, and capable of manufacture at low cost considering the benefits to be obtained.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings—

Figure 1:
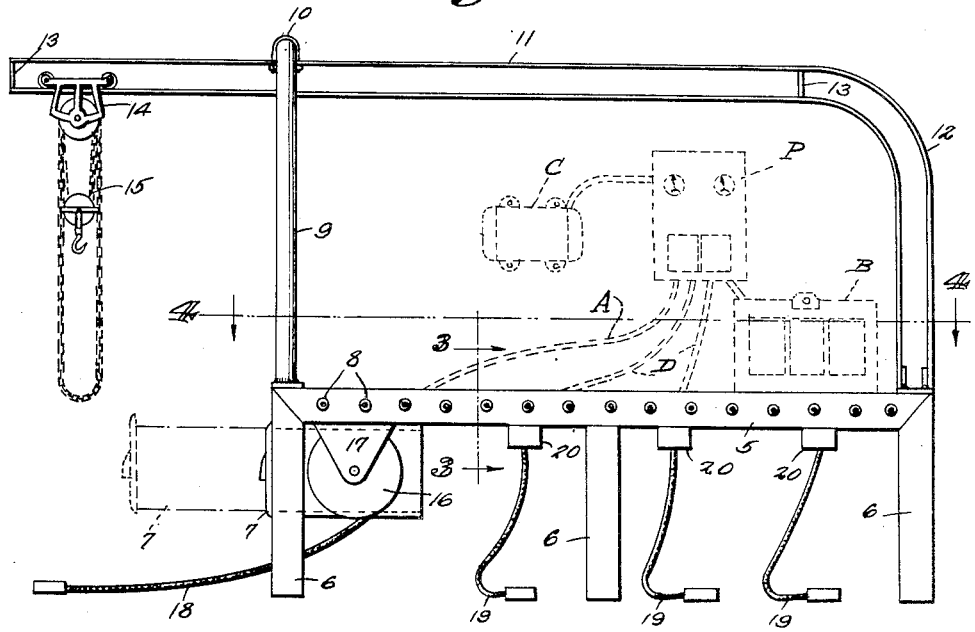
Figure 1 is a side elevational view of a battery charging table constructed in accordance with the invention.
Figure 2:
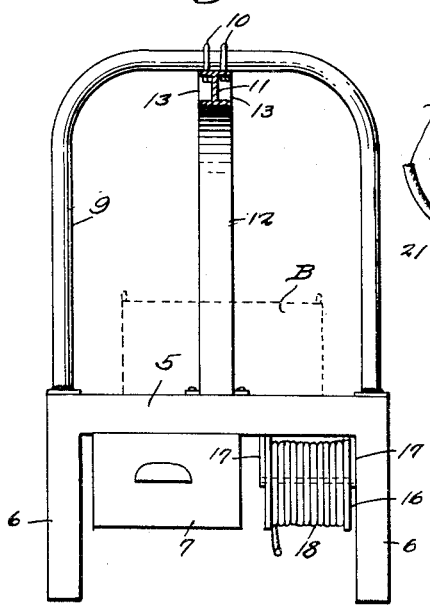
Figure 2 is a front elevational view, a portion of the front end of the super structure being cut away.

Referring to the drawings in detail, at 5 I have designated a rectangular frame, which can be of any desired length or width, which is formed from heavy channel members. The frame is preferably of a sufficient length and width to accommodate a desired number of industrial storage batteries B.

Angle iron legs 6 support the frame 5, and a drawer 7 slidably mounted below the frame and at one end thereof is adapted to permit storage of cleaning brushes, bottles of water or acids, and other equipment needed to service batteries, in a place where they are readily accessible.

Journaled in the side members of the frame 5 is a series of spaced rollers 8, that extend transversely of the frame, and it is on these rollers that a battery B is directly supported, so that the operator can with ease roll the battery to its place on the table.

Rigidly mounted, as by welding, on the frame 5 and at one end thereof is a tubular arch 9, forming part of a hoist means or super structure for the table. U-clamps 10 passed over the top of the arch immovably support to the arch an elongated I-beam 11, which at one end extends beyond the end of the table, and which at the other end merges into a supporting leg 12. The leg 12 is fixedly mounted, by any fastening means of suitable strength, to the other end of the frame 5.

The I-beam 11 defines a track for a rollably mounted hoist to be described, and limiting movement of the hoist in opposite directions respectively are stops 13.

The hoist consists of a wheeled depending hanger 14, supporting block and tackle 15.

It may be noted at this point that assuming that a lift truck, not shown, arrives at the table for recharging of its battery, the block and tackle 15 is positioned as illustrated in Fig. 1, whereupon it is lowered so as to hook on to the battery. The battery is then lifted off the truck, and the hanger 14 rolled longitudinally of the I-beam 11, until the battery is positioned above that portion of the frame 5 where it is to be deposited for recharging. The battery is then lowered onto the rollers 8, and the block and tackle unhooked so that the same operation may be performed on another battery. As necessary the batteries can be moved longitudinally of the table 5 after having been positioned thereon, by being rolled on the rollers 8.

Obviously, the operation will be reversed when it is desired to lift a battery B from the table, for remounting in the lift truck.

At C and P respectively, I have designated a conventional charger and a conventional automatic panel. Leading from the panel P is a lead A, that leads to a spool 16 dependingly and rotatably mounted below one end of the frame 5 by means of hangers 17. Wound upon the spool 16 is a polarized lead 18. Thus, after a battery B has been removed from a lift truck for recharging of the battery, the lead 18 can be connected to the truck, so that power can be supplied to the truck from the removed battery, thereby permitting the truck to be moved to a parking area. When a battery is ready for a truck, the lead 18 can be connected to the dead truck for the purpose of bringing the truck to the charging table.

Figure 3:
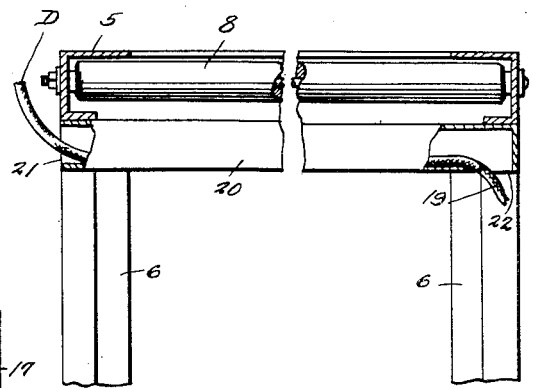
Figure 3 is an enlarged section on line 3—3 of Figure 1, portions being broken away.
Figure 4:
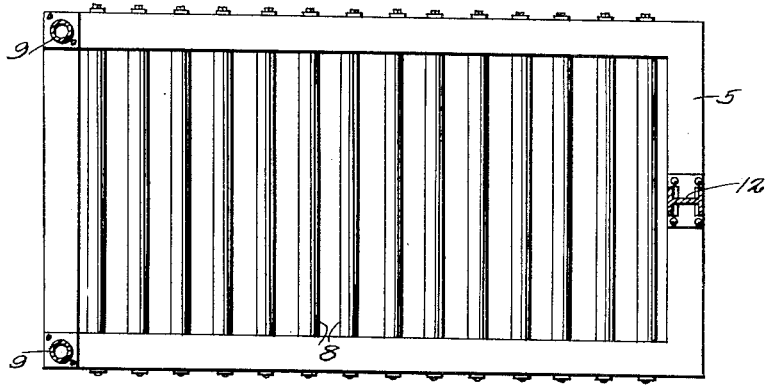
Figure 4 is a section on line 4—4 of Fig. 1.

A plurality of leads D also extend from the panel P, these leads being respectively in circuit with spaced polarized leads 19 of the charging table. Each lead 19 is used for recharging of a separate battery B. Referring to Fig. 3, the leads 19 are supported in transverse housings 20 that are rigidly secured to the under side of frame 5. Each housing has open ends 21 and 22 respectively for the leads D and 19.

Figure 5:
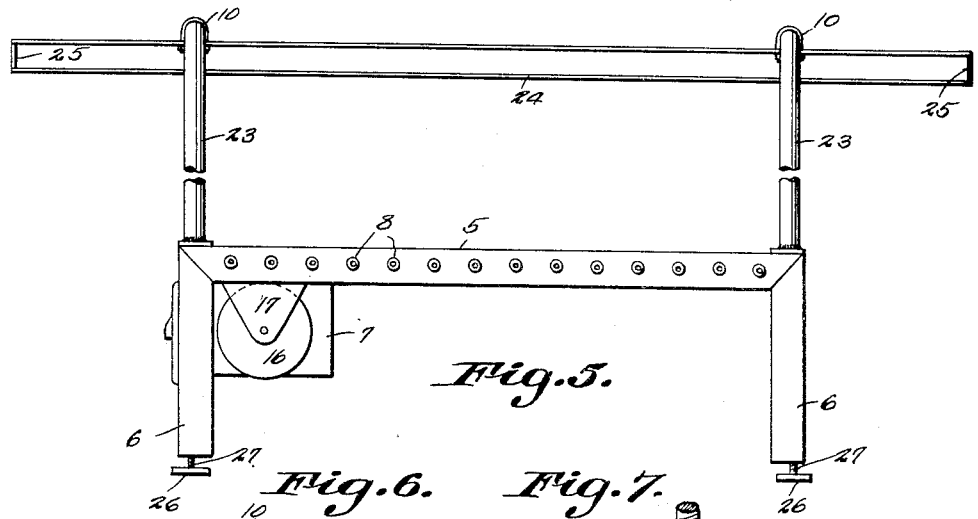
Figure 5 is a side elevational view of a modified form.
Figure 6:
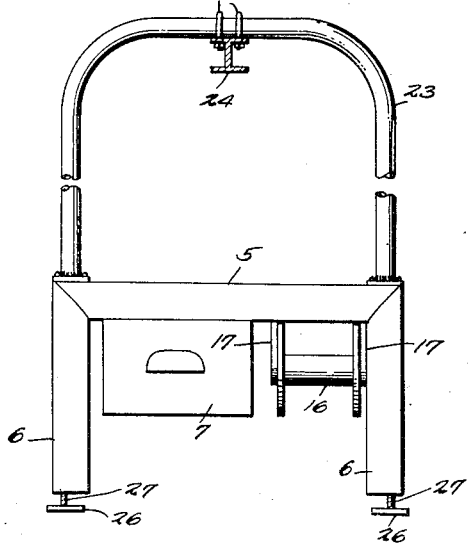
Figure 6 is a front elevational view of the form of Fig. 5.
Figure 7:
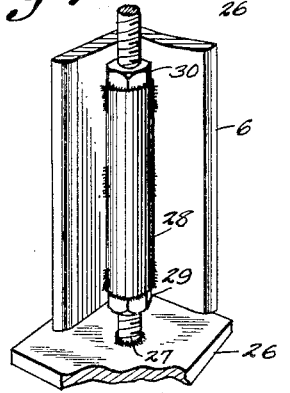
Figure 7 is an enlarged perspective view, portions being broken away, of one of the legs of the modified form.

Referring to the form of table illustrated in Figs. 5 through 7, the construction is essentially the same as described above, except that I have illustrated a modified form of super structure, and an adjustable leg structure for the table, either or both of which modifications may be used in any table in place of the corresponding construction illustrated in Figs. 1 through 4.

The modified super structure permits a battery to be placed upon or removed from the table from either end thereof. In this form, there is a pair of arches 23, one at each end of the table, and these support a straight I-beam 24, having closed ends 25, the I-beam in this instance projecting beyond both ends of the table. The wheeled hanger and block and tackle would be the same as in Fig. 1.

As to the leg adjustment, in this instance I provide flat foot plates 26, to which are respectively welded upstanding threaded rods 27 extended loosely through sleeves 28 that are welded to the legs 6 at the lower ends thereof. An adjusting nut 29 when threaded upwardly or downwardly on the rod 27 elevates or lowers sleeve 28, as the case may be, and thus adjusts the distance of the entire table from the surface on which it rests. A lock nut 30 is threadable against the upper end of the sleeve, so as to prevent the table from jarring upwardly. The plates 26 can of course be bolted to the floor if so desired.

This adjustment means permits the heights of the table to be regulated, so that in many instances, a battery can be rolled off the table directly onto a lift truck.

An important characteristic of the structure is the fact that it provides a single specific structure specially designed for facilitating the recharging of lift truck batteries, so that the entire battery recharging process is speeded up considerably. Dead trucks can be brought to and from the table with ease, by means of the polarized spool mounted lead 18. Batteries can be removed from or placed upon the lift trucks with similar speed and ease. It may be noted in this connection that the position of any battery on the table will not have to be changed, to accommodate the removal from or positioning upon the table of another battery, since the hoisting means illustrated permits the batteries to be lifted directly over other batteries and handled without difficulty in this manner.

What is claimed is:

In a battery recharging table a charging panel; a plurality of leads extending therefrom and having means at their free ends clampable to a battery to be charged; a horizontal rectangular open frame spaced from said panel and comprising a plurality of rigidly connected channel members faced toward the inside of the frame, legs supporting said frame in an elevated position, and a plurality of battery supporting rollers extended transversely of the frame and having their respecitve ends journaled inside the channel members at opposite sides of the frame; and a plurality of tubular transverse cross braces spaced longitudinally of the frame to define battery charging locations spaced longitudinally of the frame, said cross braces being rigidly secured at their ends to the undersides of the side channel members, each cross brace extending the full distance across the frame and having its opposite ends flush with the outer walls of the channel members, each cross brace constituting a housing for a single lead and having one end open and being formed with an opening in its bottom wall at its other end, said leads being extended from the panel to the respective housings and being loosely positioned through said housings with their free ends extending out of the last-named openings.

BURTON L. VIBBERT.

REFERENCES CITED

The following references are of record in the file of this patent:

UNITED STATES PATENTS

| Number | Name | Date |
|---|---|---|
| 287,913 | Dawson et al. | Nov. 6, 1883 |
| 1,285,394 | Robinson | Nov. 19, 1918 |
| 1,446,882 | Cox | Feb. 27, 1923 |
| 1,605,345 | Hawkins | Nov. 2, 1926 |
| 1,690,025 | Loveridge | Oct. 30, 1928 |
| 2,101,571 | Breisch | Dec. 7, 1937 |
| 2,250,490 | Lormor | July 29, 1941 |
| 2,262,443 | Anderson | Nov. 11, 1941 |
| 2,289,366 | Johnson | July 14, 1942 |
| 2,306,101 | Van Zandt | Dec. 22, 1942 |
| 2,413,953 | Comstock | Jan. 7, 1947 |

OTHER REFERENCES

Cannon Battery Connector Catalog, 2nd edition, March 1944, pages 1 and 3.